United States Patent
Sadasivam et al.

(10) Patent No.: US 8,948,789 B2
(45) Date of Patent: Feb. 3, 2015

(54) INFERRING A CONTEXT FROM CROWD-SOURCED ACTIVITY DATA

(71) Applicants: Shankar Sadasivam, San Diego, CA (US); Leonard Henry Grokop, San Diego, CA (US); Vidya Narayanan, San Diego, CA (US)

(72) Inventors: Shankar Sadasivam, San Diego, CA (US); Leonard Henry Grokop, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/627,702

(22) Filed: Sep. 26, 2012

(65) Prior Publication Data

US 2013/0303198 A1    Nov. 14, 2013

Related U.S. Application Data

(60) Provisional application No. 61/643,966, filed on May 8, 2012.

(51) Int. Cl.
*H04W 24/00* (2009.01)
*H04M 3/42* (2006.01)

(52) U.S. Cl.
USPC ............. 455/456.3; 455/414.2; 455/456.1

(58) Field of Classification Search
CPC ....... H04W 4/02; H04W 4/023; H04W 4/025; H04W 4/028; H04W 4/04; H04W 64/00; G01S 19/39; G01S 5/00; G01S 5/0278; G01S 5/0284; G01S 5/0289; H04M 1/72563; H04M 1/72569
USPC .................. 455/404.2, 414.2, 456.1–457
See application file for complete search history.

(56) References Cited

U.S. PATENT DOCUMENTS

| | | | |
|---|---|---|---|
| 7,603,112 B2 | 10/2009 | Huomo et al. | |
| 7,973,857 B2 | 7/2011 | Ahmaniemi et al. | |
| 8,000,689 B2 | 8/2011 | Featherstone et al. | |
| 2007/0101274 A1 | 5/2007 | Kurlander et al. | |
| 2007/0184851 A1* | 8/2007 | Barnwell et al. | 455/456.1 |
| 2009/0088138 A1* | 4/2009 | Jung et al. | 455/414.1 |
| 2010/0255830 A1 | 10/2010 | Manolescu et al. | |
| 2010/0306711 A1 | 12/2010 | Kahn et al. | |
| 2010/0331017 A1 | 12/2010 | Ariga | |
| 2011/0099277 A1* | 4/2011 | Yao et al. | 709/226 |
| 2011/0126119 A1* | 5/2011 | Young et al. | 715/744 |
| 2012/0149309 A1* | 6/2012 | Hubner et al. | 455/67.11 |
| 2012/0264446 A1* | 10/2012 | Xie et al. | 455/456.1 |
| 2012/0290434 A1* | 11/2012 | Moritz et al. | 705/26.7 |
| 2013/0184007 A1* | 7/2013 | Hategan et al. | 455/456.1 |

OTHER PUBLICATIONS

International Search Report and Written Opinion—PCT/US2013/036798—ISA/EPO—Jul. 15, 2013.

* cited by examiner

*Primary Examiner* — Michael Mapa
(74) *Attorney, Agent, or Firm* — Kilpatrick Townsend & Stockton LLP

(57) ABSTRACT

Techniques are provided to infer a context associated with a mobile device based on aggregated data from a set of other mobile devices. The set of mobile devices can include mobile devices currently or previously near a location of the mobile device. Each mobile device in the set of other mobile devices can collect sensor data and infer a low-level context (e.g., "sitting" or "standing"). The low-level contexts can be aggregated. Based on the aggregated low-level contexts, a high-level context (e.g., "at a party" or "watching television") associated with the mobile device can be inferred or a low-level context associated with the mobile device can be refined.

40 Claims, 11 Drawing Sheets

Device Position: In Pocket
Motion-State: Stationary
High-Level Context: At Sporting Event Device Position: In Pocket
Motion-State: Stationary
High-Level Context: At Home; Watching TV Device Position: In Pocket
Motion-State: Stationary
High-Level Context: Out to Eat Device Position: In Pocket
Motion-State: Stationary
High-Level Context: At Work; In Meeting

INFERRING A CONTEXT FROM CROWD-SOURCED ACTIVITY DATA

CROSS-REFERENCES TO RELATED APPLICATIONS

The present application is a non-provisional patent application, claiming the benefit of priority of U.S. Provisional Application No. 61/643,966, filed on May 8, 2012, entitled, "INFERRING A CONTEXT FROM CROWD-SOURCED ACTIVITY DATA," which is hereby incorporated by reference in its entirety.

BACKGROUND

Within even a single day, a person encounters a large variety of contexts. For example, the person may begin a day by being at home with his family and getting prepared for work. He may later go to work, where he works alone in his office and goes to meetings. At lunch, he may go out to eat. After work, he may go on a run alone. Finally, he may return home and attend a small social gathering. What is expected of or desired by the person may depend on the context. However, it can be difficult to automatically determine the context.

SUMMARY

Techniques are provided to infer a context that a user of a mobile device is in. In one embodiment, sensors in the mobile device can collect data. Based on the sensor data, a location, device position and/or motion state of the mobile device can be estimated. The mobile device can be associated with a set of other mobile devices (e.g., other mobile devices simultaneously or previously located at a similar location as the mobile device). A statistical summary can be generated based on data collected from each of the other mobile devices. For example, a histogram representing a number of other mobile devices near the mobile device or motion states of the other devices can be generated. Based on the statistical summary, a context of the user can be inferred (e.g., based on comparing the histogram to templates associated with various contexts).

In some embodiments, a method for inferring a high-level context associated with a mobile device is provided. The method can include accessing low-level context information for each of a plurality of other devices. Location information associated with each of the other devices can indicate a proximity to a location of the mobile device. The low-level context information for each of the other devices can be based on data collected by a sensor of the respective other device. The method can also include aggregating the low-level context information for each of the plurality of other devices. The method can further include comparing the aggregated low-level context information to a plurality of templates. Each template can be associated with a high-level context. The method can still further include inferring the high-level context associated with the mobile device using the template comparisons.

In some embodiments, a system for inferring a high-level context associated with a mobile device is provided. The system can include a context aggregator configured to access low-level context information for each of a plurality of other devices. Location information associated with each of the other devices can indicate a proximity to a location of the mobile device. The low-level context information for each of the other devices can be based on data collected by a sensor of the respective other device. The context aggregator can be further configured to aggregate the low-level context information for each of the plurality of other devices. The system can also include a high-level template comparison engine configured to compare the aggregated low-level context information to a plurality of templates. Each template can be associated with a high-level context. The system can further include a high-level context inferring engine configured to infer the high-level context associated with the mobile device using the template comparisons.

In some embodiments, a system for inferring a high-level context associated with a mobile device is provided. The system can include means for accessing low-level context information for each of a plurality of other devices. Location information associated with each of the other devices can indicate a proximity to a location of the mobile device. The low-level context information for each of the other devices can be based on data collected by a sensor of the respective other device. The system can also include means for aggregating the low-level context information for each of the plurality of other devices. The system can further include means for comparing the aggregated low-level context information to a plurality of templates, each template being associated with a high-level context. The system can still further include means for inferring the high-level context associated with the mobile device using the template comparisons.

In some embodiments, a computer-readable storage medium is provided containing program instructions, that, when executed by a processor, cause the processor to execute a method. The method can include accessing low-level context information for each of a plurality of other devices. Location information associated with each of the other devices can indicate a proximity to a location of the mobile device. The low-level context information for each of the other devices can be based on data collected by a sensor of the respective other device. The method can also include aggregating the low-level context information for each of the plurality of other devices. The method can further include comparing the aggregated low-level context information to a plurality of templates. Each template can be associated with a high-level context. The method can still further include inferring the high-level context associated with the mobile device using the template comparisons.

In some embodiments, a method for inferring a context associated with a mobile device is provided. The method can include accessing low-level context information for each of a plurality of other devices. Location information associated with each of the other devices can indicate a proximity between a location of the other device at a first time and a location of the mobile device at a second time, the first time and the second time being different. The low-level context information for each of the other devices can be based on data collected by a sensor of the respective other device. The method can also include aggregating the low-level context information for each of the plurality of other devices. The method can further include inferring the context associated with the mobile device based on the aggregated low-level context information.

In some embodiments, a system for inferring a context associated with a mobile device is provided. The system can include a context aggregator configured to access low-level context information for each of a plurality of other devices. Location information associated with each of the other devices can indicate a proximity between a location of the other device at a first time and a location of the mobile device at a second time, the first time and the second time being different. The low-level context information for each of the other devices can be based on data collected by a sensor of the respective other device. The context aggregator can further be configured to aggregate the low-level context information for each of the plurality of other devices. The system can also include a context inferring engine configured to infer the context associated with the mobile device based on the aggregated low-level context information.

In some embodiments, a system for inferring a context associated with a mobile device is provided. The system can include means for accessing low-level context information for each of a plurality of other devices. Location information associated with each of the other devices can indicate a proximity between a location of the other device at a first time and a location of the mobile device at a second time, the first time and the second time being different. The low-level context information for each of the other devices can be based on data collected by a sensor of the respective other device. The system can also include means for aggregating the low-level context information for each of the plurality of other devices. The system can further include means for inferring the context associated with the mobile device based on the aggregated low-level context information.

In some embodiments, a computer-readable storage medium is provided containing program instructions, that, when executed by a processor, cause the processor to execute a method. The method can include accessing low-level context information for each of a plurality of other devices. Location information associated with each of the other devices can indicate a proximity between a location of the other device at a first time and a location of the mobile device at a second time, the first time and the second time being different. The low-level context information for each of the other devices can be based on data collected by a sensor of the respective other device. The method can also include aggregating the low-level context information for each of the plurality of other devices. The method can further include inferring the context associated with the mobile device based on the aggregated low-level context information.

DETAILED DESCRIPTION

Figure 1A:
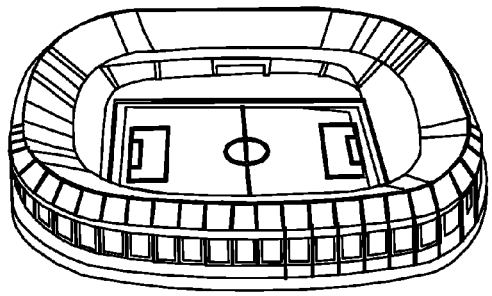
FIGS. 1A-1D illustrate multiple contexts that can give rise to similar sensor data.

Mobile devices can include one or more sensors that can collect data from a local environment. For example, an accelerometer can collect acceleration data that can be used to determine a movement and/or tilt of the mobile device. Based on the sensor data, low-level contexts can be inferred. The low-level contexts can include motion states and/or device positions (MSDP). Motion states can include, e.g., standing, walking, running, cycling, fiddling, resting or driving. Device positions can include, e.g., in pants pocket, in jacket pocket, in hand, or on desk. Thus, motion states and device positions cannot be identified with certainty based on sensor data but can be inferred based on stereotypical sensor patterns associated with the states and positions. Low-level contexts can further include place types, place identifiers, or audio environments (e.g., single voice present, multiple voices present, or many voices present).

The mobile device can be associated with a set of other mobile devices. For example, a location of the mobile device can be estimated, and the set can include mobile devices that are or were previously proximate to the location. Proximate devices can include devices within a fixed structure (e.g., a football arena, a building, etc.) or within a relative area (e.g., 100, 50, 25, 10 or 5 feet from a central location). Thus, a proximity between the mobile device and one of the other mobile devices can include an absolute distance, an indication that a distance is below a threshold or an indication that both devices are within a same structure. Data associated with each mobile device of the set of mobile devices can be accessed, and the data can be aggregated. For example, the aggregated data can indicate that 15 mobile devices are currently within 20 feet from the mobile device; that 100 mobile devices are currently within a mile from the mobile device, 90% of which are inferred to be in a motion state of "driving"; or that 70% of mobile devices that were previously within 10 feet of the location were "walking" and the other 30% were "standing".

Based on the aggregated data, a context of the mobile device can be inferred (e.g., by comparing the aggregated data to context-associated templates). For example, it can be estimated that if most nearby mobile devices are "driving", then the mobile device is also "driving". As another example, it can be estimated that if a location is consistently associated with frequent "walking" and "standing", then the mobile device is "out in public". Thus, as these examples illustrate, the aggregated data can be used to fine-tune an inferred low-level context and/or to infer a high-level context associated with an activity or event. High-level contexts can characterize an activity and/or situation. For example, high-level contexts can include: attending a meeting, presenting in a meeting, shopping, commuting, at the movies, watching television, exercising, or eating lunch. Various functionalities can be selectively presented or tailored based on the context. For example, recording functions can be prominently presented on a mobile phone when a "meeting" context is inferred, or phone calls can be automatically routed to voice mail when a "driving" context is inferred.

Figure 1B:
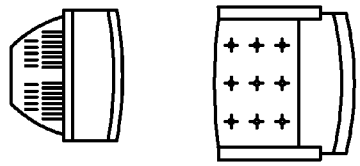
Figure 1C:
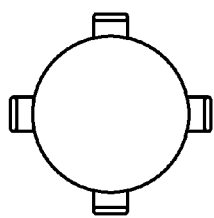
Figure 1D:
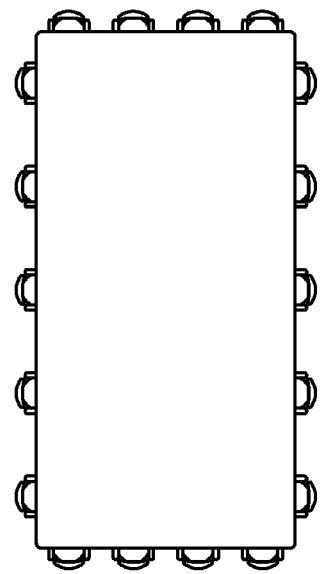

FIGS. 1A-1D illustrate four contexts that can give rise to similar sensor data. FIG. 1A represents a football stadium, such that a user can be sitting in the stands watching a football game surrounding by tens of thousands of other sports fans. FIG. 1B represents a recliner in front of a television, such that a user can be sitting on the recliner, watching a television show alone. FIG. 1C represents a table in a restaurant, such that a user can be enjoying a meal with a social group, while surrounds by several dozen other patrons in the restaurant. FIG. 1D represents a conference room, such that a user is interacting with about fifteen other co-workers. Thus, the actual situations differ dramatically between the four contexts. Further, desired mobile-device functionalities can also strongly differ. For example, a user may wish that his phone vibrate (rather than ringing) when he is in the meeting of FIG. 1D and that his phone ring at the loudest setting when he is in the sporting-event context of FIG. 1A. However, the low-level MSDP inferences can be similar or even identical across all four figures. In each instance, a user can be sitting, with the mobile device in his pocket.

By utilizing crowd-sourcing technology, contexts representing by FIGS. 1A-1D can be distinguished. For example, even a detection of a number of nearby devices can be informative to distinguish the four contexts. The context represented in FIG. 1A could be associated with thousands of nearby devices, while the context represented in FIG. 1B could be associated with no nearby devices. This information alone can result in uncertainty in attempts to distinguish the context of FIG. 1C and FIG. 1D. Device proximity can be similar in the restaurant and conference-room context. However, in the restaurant context, there can be a higher probability that nearby devices are associated with a "walking" motion state. Thus, the low-level data can further improve context inferences.

Figure 2:
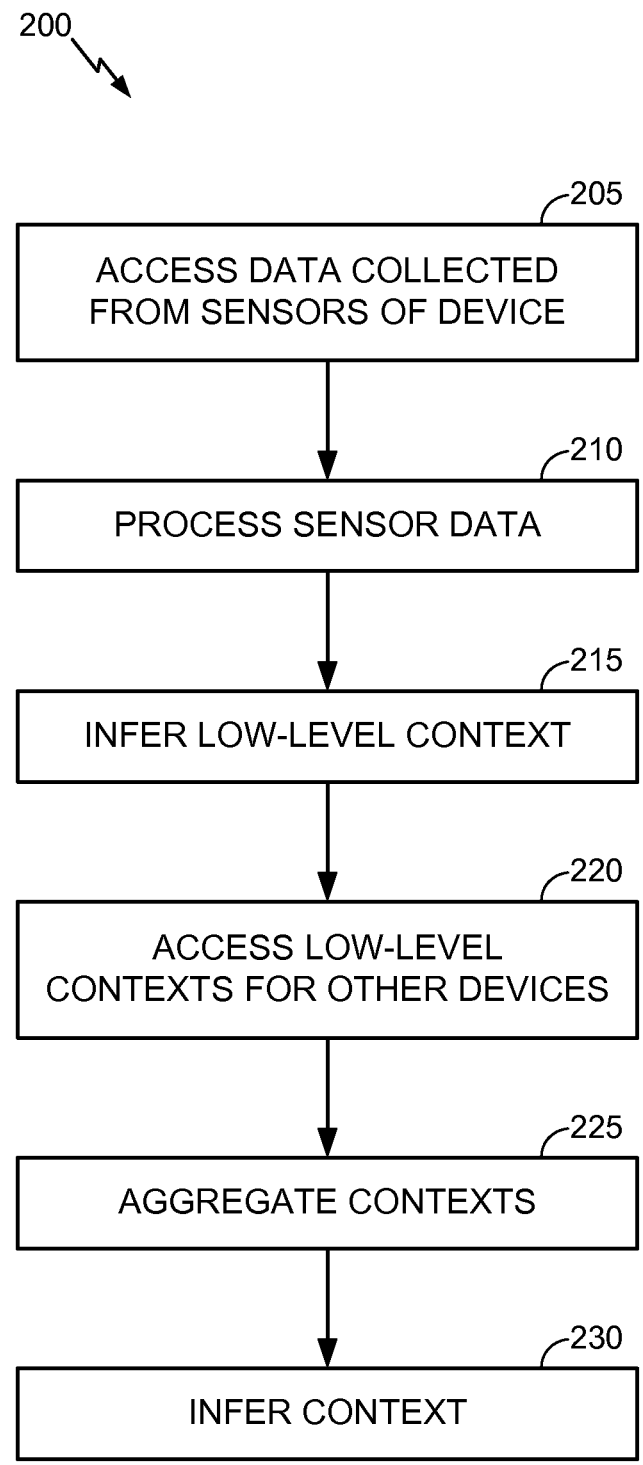
FIG. 2 is a flow diagram of a process for inferring a context according to one embodiment of the present invention.

FIG. 2 is a flow diagram of a process 200 for inferring a context according to one embodiment. Part or all of process 200 can be performed by a mobile device and/or remote server, as further detailed below.

Process 200 starts at 205 when data collected from one or more sensors of a mobile device is accessed. The sensors can include, e.g., an accelerometer, light sensor, proximity sensor, camera, Global Positioning Satellite (GPS) sensor, or microphone. Thus, the data can include, e.g., acceleration signals, light-intensity signals, nearby device signals, a picture, a GPS signal, or an audio signal.

At 210, the sensor data is processed. For example, a pitch or a role can be determined based on acceleration data. As another example, Mel-frequency cepstral coefficients can be determined based on audio data. As yet another example, a motion or speed can be determined based on multiple time-lapsed GPS signals (e.g., by determining a first geographic location based on a first set of signals and a second geographic location based on a second set of signals, and then calculating a speed by dividing a distance between the locations by a time difference).

The processing can include applying one or more algorithms, techniques and/or models. For example, a Hidden Markov Model inference can be used to infer an underlying state based on the outputs of the sensor data. As another example, a clustering technique can be employed using previous device-specific or cross-device data. For example, using a k-means technique, data can be assigned to a cluster "nearest" to the data values.

The processing can include processing time-extended sensor. For example, sensor data can be smoothed, averaged, filtered (e.g., with a smoothing function, majority-vote unweighted function or majority-vote weighted function). As another example, probability statistics can be generated (e.g., a probability-distribution histogram or mode).

At 215, a low-level context is inferred based on the processed sensor data. The low-level context can include, e.g., a geographic location (e.g., geographical coordinates), device position and/or motion state. In some instances, multiple low-level contexts can be simultaneously estimated. The low-level context can be inferred based on templates associating sensor data with low-level contexts or a learning algorithm (using user-identified or user-revised low-level contexts as truths).

As an example of an inferred contest, use of a Hidden Markov Model inference technique can indicate that there is a 75% probability a user of the mobile device is "standing", a 20% probability that the user is "sitting" and a 5% probability that the user is "walking" based on the processed sensor data. In some instances, the inferred low-level context includes a single inference with regard to one type of context. Thus, the low-level context can include the low-level context that is most probable (e.g., "standing" in the above example). In some instances, the inferred low-level context can include more detailed inferences (e.g., identifying the probability of all three of the above-listed potential contexts).

At 220, low-level contexts associated with other mobile devices are accessed. The other mobile devices can include other mobile devices associated with a similar or same location, location type (e.g., "football fields", "sporting-event location" or "school"), time, time context (e.g., "meal time", "getting ready for the workday time", or "afternoon") and/or situational label.

A situational label can be meaningful or arbitrary. In some instances, a user can label a low-level or high-level context. For example, a user can input text or select from options to identify a motion state (e.g., in response to a prompt asking: "Are you driving, walking or cycling?"). As another example, a user may be asked to input a context name, and the user may input "Shopping", "walking the dog", or "baseball game." In this instance, names referring to similar or same contexts can vary across entries from different users even if they are referring to a same type of situation. Thus, matching criteria can be relaxed as compared to an instance in which a user selects a context from pre-defined options. In some instances, the situational label is determined based on offline or online training that associate specific sensor data with a label (e.g., "Situation A", "Situation B", etc.). Other mobile devices can have other associations, and situations from the mobile device can be matched to situations from other mobile devices (e.g., "Situation A" for the mobile device can frequently co-occur with "Situation B" for a first other mobile device when they are near each other).

The other mobile devices for which low-level contexts are accessed at block 220 can include mobile devices associated with a past or current location satisfying a location-based and/or time-based criterion. The location-based criterion can identify a threshold distance from a location of the mobile device or a type of location. For example, the other mobile devices can include mobile devices associated with a current location less than 20 feet from a location of the mobile device. As another example, the other mobile devices can include mobile devices associated with a restaurant location. The location-based criterion can include functional location-based criterion. For example, the other mobile devices can include those detected based on Bluetooth discovery from the mobile device.

The time-based criterion can identify when the location-based criterion was satisfied (e.g., if another mobile device is currently near the mobile device or was at a "shopping mall" on a weekday afternoon) or a situational-label matching occurred. Thus, for example, in some instances, the other mobile devices can include mobile devices that are currently near the mobile device or that are currently assigned to a matched situation as compared to a situation label of the mobile device. In some instances, the temporal matching can be relaxed or non-existent. For example, other mobile devices can include all mobile devices that were ever detected to be within 5 feet from a current location of the mobile device, or that were detected to be within a 5-foot radius on any weekday between 1 pm-5 pm within the past year. This type of criteria can be particularly informative when a mobile device is in a public place. For example, if data was collected from mobile devices within a one-mile radius of a current location over a period of a year, a drastic variation in other-device presence can allow for an estimation that the current location is a sporting-event area (e.g., a football stadium having a high density of mobile devices on Sundays during the fall and a low density otherwise).

The type of low-level contexts accessed can be the same or can vary across the other devices. Further, the type of low-level context associated with one or more other devices can be the same or can vary as compared to the type of low-level context inferred at block 215. A single type or multiple types of low-level contexts can be accessed for some or all of the other devices and can be inferred at block 215. In some instances, the accessed low-level contexts include contexts that have met a confidence criterion. For example, motion-state and device-position contexts can be accessed for all devices currently near the mobile device and for which an inferred low-level context is associated with a confidence metric exceeding a threshold. Thus, for some nearby devices, both inferred motion-state and device-position contexts can be accessed. For some nearby devices, either a motion-state or device-position context can be accessed. For some nearby devices, neither context is accessed.

In some instances, low-level contexts associated with multiple sets of other mobile devices are simultaneously or separately accessed. For example, if it inferred that a person is walking, the other mobile devices can include those that are 30 feet or less from the mobile device. Meanwhile, if it is inferred that a person is sitting, the other mobile devices can include those that are 10 feet or less from the mobile device. As another example, data can be gathered from mobile devices with 10 feet and aggregated, and data can be gathered from mobile devices within 30 feet and aggregated. Subsequent analysis can then simultaneously consider probability values associated with each aggregation (e.g., to infer one context if the distributions are similar and another if they are not). As yet another example, data can be gathered and aggregated from other mobile devices that are determined via GPS data to be within a 200 meter radius from the mobile device, and data can also be gathered and aggregated from other mobile devices that are discovered via Bluetooth discovery from the mobile device.

At 225, the low-level contexts of the other devices can be aggregated. The aggregation can involve counting a number of mobile devices having met a location-based and/or time-based criterion. The aggregation can alternatively or additionally characterize low-level contexts of the other devices. For example, the aggregation can involve a probability that a particular low-level context was inferred across the set of other devices, a probability distribution of low-level context values, a most prevalent low-level context, a weighted average of a low-level context, or cross-dependencies associated with multiple low-level contexts. The aggregation can involve applying one or more weights to the data being aggregated. Those mobile devices closest in time and/or space or sensor characteristics can be weighted heavily. In some instances, the aggregation is confined to aggregate contexts that are of a same or similar type (e.g., aggregating device-position contexts and separately aggregating motion-state contexts). In some instances, the aggregation includes cross-type aggregations. For example, a number of devices associated with any type of low-level context accessed at block 220 can be determined (e.g., to estimate a number of nearby devices).

In some instances, the aggregation excludes data from the mobile device. For example, inferred motion-state contexts can be aggregated for all nearby devices, the aggregation not including an inferred motion state for the mobile device. In some instances, the aggregation includes data from the mobile device. Data from the mobile device (e.g., an inferred low-level context) can be preferentially weighted such that it has a larger influence on future processing than do other devices.

At 230, a context is inferred based on the aggregated low-level context. The inferred context can be a high-level context or a low-level context. High-level contexts can characterize an activity and/or situation. For example, high-level contexts can include: attending a meeting, presenting in a meeting, shopping, commuting, at the movies, watching television, exercising, or eating lunch. In some instances, a low-level context can be inferred. The inference can include improving a confidence of a previous low-level-context inference or revising a previous low-level-context inference based on the aggregated data.

The inference can be based on templates associated with a set of contexts. For example, "shopping" can be associated with a large number of nearby mobile devices having a low-level context of "walking". By comparing a particular aggregation to the set of templates, a preferred context (e.g., best match) can be identified. Additional factors (e.g., time of day, day of the week or low-level context inference confidence) can influence the inference either prior to or after the template application. For example, different templates can be associated with a "eating" context depending on whether it is noon or 10 pm. As another example, the same template can be associated with the "eating" context, but there can be a lower probability that the context is selected at 10 pm as compared to noon.

In some instances, the aggregated data is used in conjunction with local information (e.g., a locally inferred low-level context or locally collected sensor data) to perform temporal clustering of an evolving situation or context. Temporal clustering can include, e.g., spectral clustering or probabilistic graphical models. Thus, a mobile device 110a can repeatedly infer a context or can repeatedly update a context inference based on a more limited number of aggregated data sets.

The temporal clustering can result in assignment to an unlabeled cluster. In some instances, the mobile device can request that a user of the mobile device label a current context (e.g., "What are you doing now?" or "Are you at work, at home or at a social event?") such that the cluster can thereafter be labeled (or to verify a context inference). The labeling can improve, e.g., a selection of which apps are presented to users or how a setting is set.

In some instances, a cluster can be labeled without receiving user input. For example, in offline training, a training mobile device can be brought into a variety of contexts, and training personnel can input labels identifying the context (e.g., "meeting room", "crowded public place", or "restaurant"). Clustering techniques (performed by similar types of mobile devices) can then use the training clusters as base clusters or can match dynamically generated clusters to training clusters.

Figure 3:
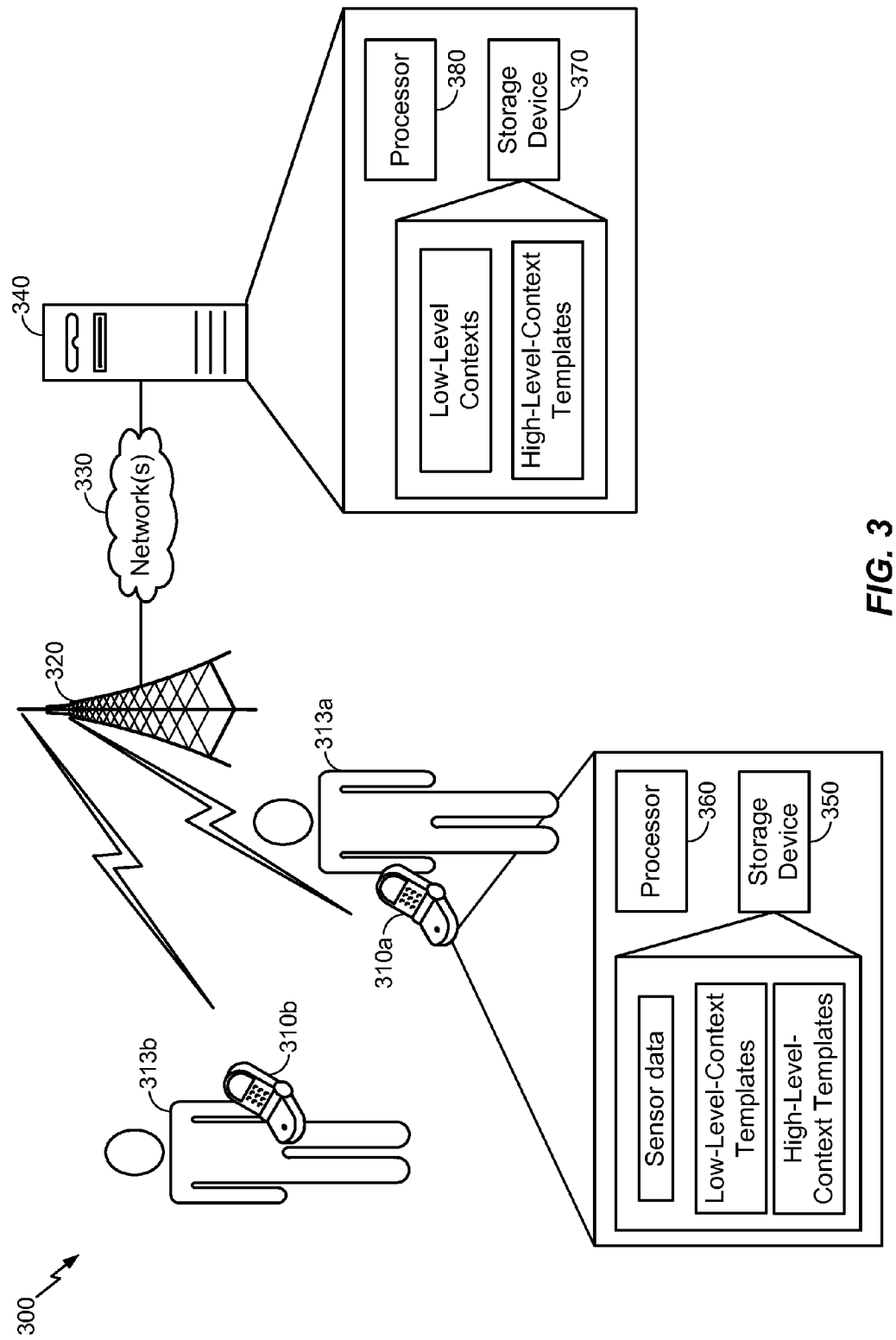
FIG. 3 illustrates an apparatus for inferring a context according to one embodiment of the present invention.

As noted above, process 200 can be performed by a mobile device and/or other independent devices or systems. FIG. 3 illustrates an apparatus 300 for inferring a context according to one embodiment of the present invention. As shown in FIG. 3, apparatus 300 can include a mobile device 310a, which can be used by a user 313a. A mobile device 310 can communicate with a remote server 340 via wireless network 320 and network(s) 330. Wireless network 320 can represent a cellular service provider's wireless network. Wireless network 320 can use one or more network(s) 330 to communicate with remote server 340. Network(s) 330 can include one or more private networks, such as a corporate intranet, and/or one or more public networks, such as the Internet.

Mobile device 310a can include a transmitter configured to transmit radio signals, e.g., over a wireless network. Mobile device 310a can represent a cellular phone, a smart phone, or some other mobile computerized device, such as a personal digital assistant, tablet computer, laptop, handheld gaming device, digital camera, etc. Mobile device 310a, as shown in FIG. 3, can include a variety of sensors (not shown or labeled), such as an accelerometer, light sensor, proximity sensor, camera, Global Positioning Satellite (GPS) receiver, or microphone.

A storage device 350 in mobile device 310a can store collected sensor data. A processor 360 can process the sensor data and infer a low-level context based on stored low-level-context templates. The inferred low-level context can be transmitted to remote server 340. At the remote server, low-level contexts can be stored at a storage device 370 for each of a plurality of devices. For example, low-level contexts can also be received and stored from one or more other mobile devices 310b. The stored low-level contexts can be associated with metadata identifying, e.g. a location, time, and/or user identity. A processor 380 at remote server 340 can appropriately aggregate the low-level contexts across devices. The aggregated data can be transmitted back to mobile device 310a, and mobile device 310a can infer a high-level contexts, e.g., based on stored high-level context templates.

Figure 4:
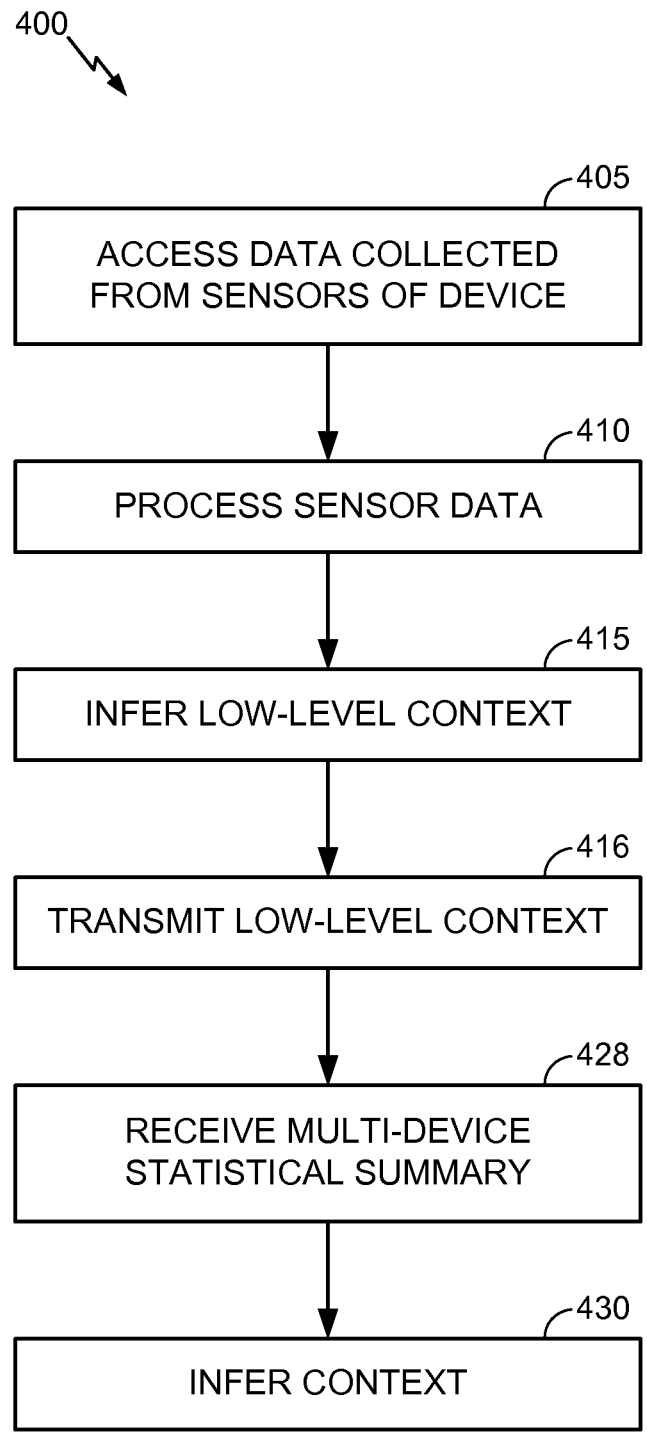
FIG. 4 is a flow diagram of a process for inferring a context according to one embodiment of the present invention.
Figure 5:
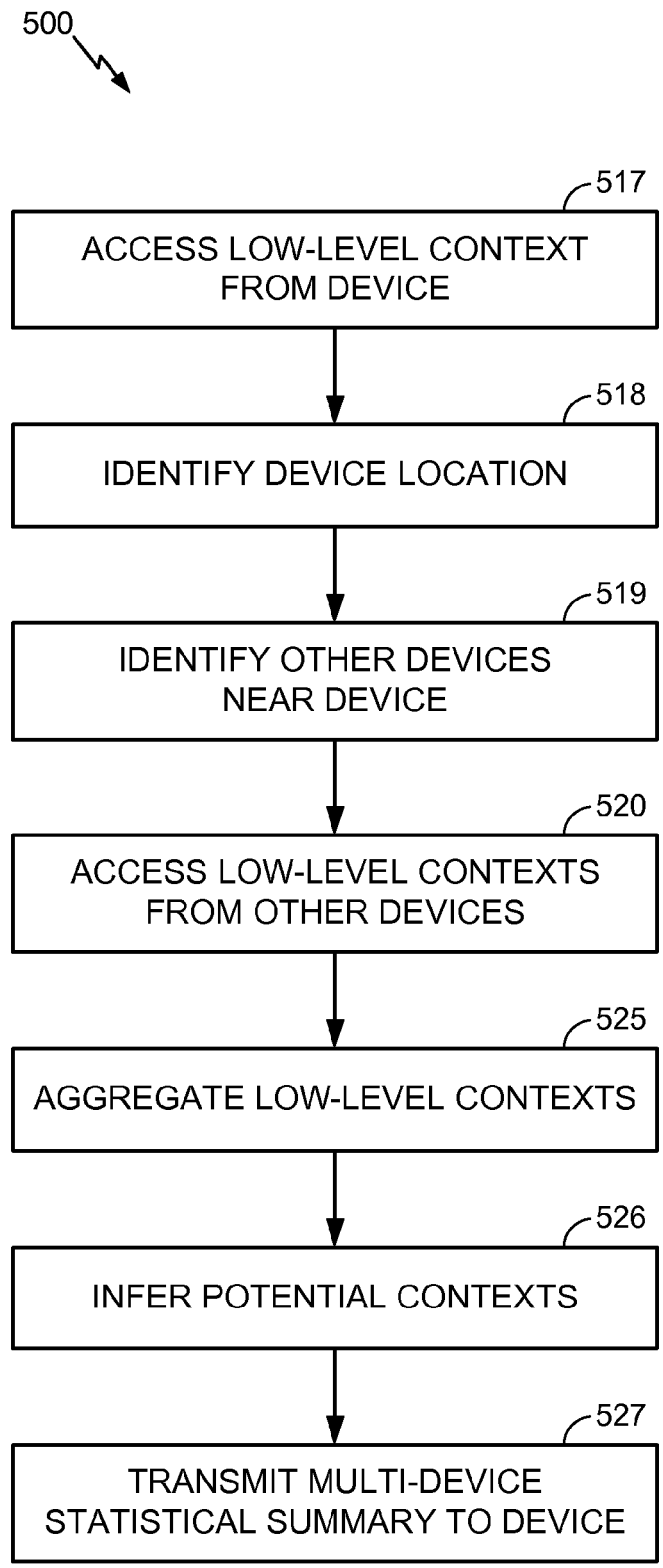
FIG. 5 is a flow diagram of a process for inferring a context according to one embodiment of the present invention.

FIGS. 4 and 5 are flow diagrams of processes 400 and 500 for inferring a context according to one embodiment. Process 400 can be performed by mobile device 310a, and process 500 can be performed by remote server 340. These processes illustrate how mobile device 310a and remote server 340 can interact to infer a context. A number of the blocks of process 400 shown in FIG. 4 and process shown in FIG. 5 are similar to similarly numbered blocks of process 200.

In process 400, after the low-level context is inferred, the low-level context is transmitted from mobile device 310a to remote server 340 at block 416. Mobile device 310a can transmit the low-level context at fixed intervals or after fulfillment of one or more conditions. For example, the transmission can occur every T seconds, with T being a value between 60 seconds and 600 seconds. As another example, the transmission can occur after a new low-level context is inferred (e.g., "running" versus a previous "walking") or after a change in position is detected (e.g., having moved at least 50 feet since a previous transmission).

Remote server 340 then accesses the low-level context at block 517 and identifies a device location at block 518. A signal transmitted from mobile device 310a to remote server 340 (e.g., a signal including the low-level context or another signal) can explicitly identify the location or include data that can be used to estimate the location. The location can include an absolute location and can be estimated at the mobile device 310a or remote server 340 based on signals received from transmitters at known locations (e.g., GPS satellites, WiFi access points, or cell towers).

At block 519, remote server 340 identifies other mobile devices 310b near the mobile device 310a. For example, other mobile devices 310b can include those near the identified location or near or at a similar type of location. The other mobile devices 310b can be identified, e.g., by comparing GPS coordinates, evaluating similarities between WiFi fingerprints, matching audio environments, using synchronized high frequency audio pilot tone transmissions, using calendar data (indicating that users of other mobile devices 310b are scheduled to be near a mobile of the mobile device 310a). In some instances, mobile device 310a identifies other nearby mobile devices 310b (e.g., via Bluetooth discovery) and transmits the identity of the other mobile devices 310b to remote server 340. The other mobile devices 310b can include other devices at a similar absolute time or time context. In one instance, the other mobile devices include those associated with a similar location and absolute time. In another instance, the other mobile devices include those associated with a similar time context and location. In another instance, the other mobile devices include those associated with a similar location and/or location type (e.g., irrespective of time). In yet another instance, the other mobile devices include those associated with a similar situation (e.g., determined based on automatic classifications or user identifications).

At blocks 520 and 525, low-level contexts from the identified other mobile devices 310b are accessed and aggregated as described above. In some instances, at block 526, remote server 340 infers one or more potential contexts (e.g., low- or high-level contexts) based on the aggregated data. The potential-context inference can include a list of potential contexts, which can be ordered or weighted based on a confidence. The potential-context inference can be based on comparing the aggregated data to a set of templates. For example, remote server 340 can include a set of high-level-context templates: each template can include one or more histograms of MSDP data from other mobile devices 310b (and, potentially mobile device 310a as well). Remote server 340 can compare each template to the aggregated context (e.g., one or more histograms of MSDP data in the aggregated contexts) and determine how well the histograms are matched. Remote server 340 can associate some or all contexts with a match score (which can be interpreted as a context probability or confidence). Remote server 340 can select a subset of the contexts with high match scores, or can select one context with a high match score.

At block 527, a multi-device statistical summary is transmitted back to mobile device 310a. The multi-device statistical summary can include, e.g., the aggregated low-level contexts (e.g., MSDP histograms), template-match scores associated with one or more contexts, an unordered or ordered short list of contexts, and/or a single context. The transmission can occur at fixed intervals, in response to requests received from the mobile device, or in response to detecting a difference (e.g., generally or of a given magnitude or quality) in the multi-device statistical summary).

At block 428, mobile device 310a receives the multi-device statistical summary. Base on the multi-device statistical summary, mobile device 310a can infer a context at block 430. The inferred context may or may not be based on additional data not in the multi-device statistical summary. For example, the multi-device statistical summary can identify a short list of potential contexts based on MSDP histograms from other mobile devices 310b, and mobile device 310a can select amongst the short list based on its own MSDP information. In some instances, mobile device 310a can use data from the multi-device statistical summary to perform a context inference in a Bayesian fashion or to score. For example, a histogram in the statistical summary can be used as a prior, and subsequently received or accessed sensor data from mobile device 310a can be used as an output. Thus, a context can be inferred based on determining which context would have most been most likely to have occurred and to have resulted in the output. In some instances, mobile device 310a can use data from the multi-device statistical summary to score, shortlist candidate and/or select one or more contexts from amongst contexts identified locally based on local sensor data. In instances in which the multi-device statistical summary includes a single inferred context, the context inferred at mobile device 310a at block 430 can be the same as the single inferred context from the summary (e.g., involving little to no additional processing).

FIGS. 3-5 illustrate how mobile device 310a and remote server 340 can interact to infer a context in some embodiments. Using the remote server allows a mobile device 310a to be able to draw upon data from other mobile devices 310b. However, the specific allocation and configurations can be modified.

Figure 6:
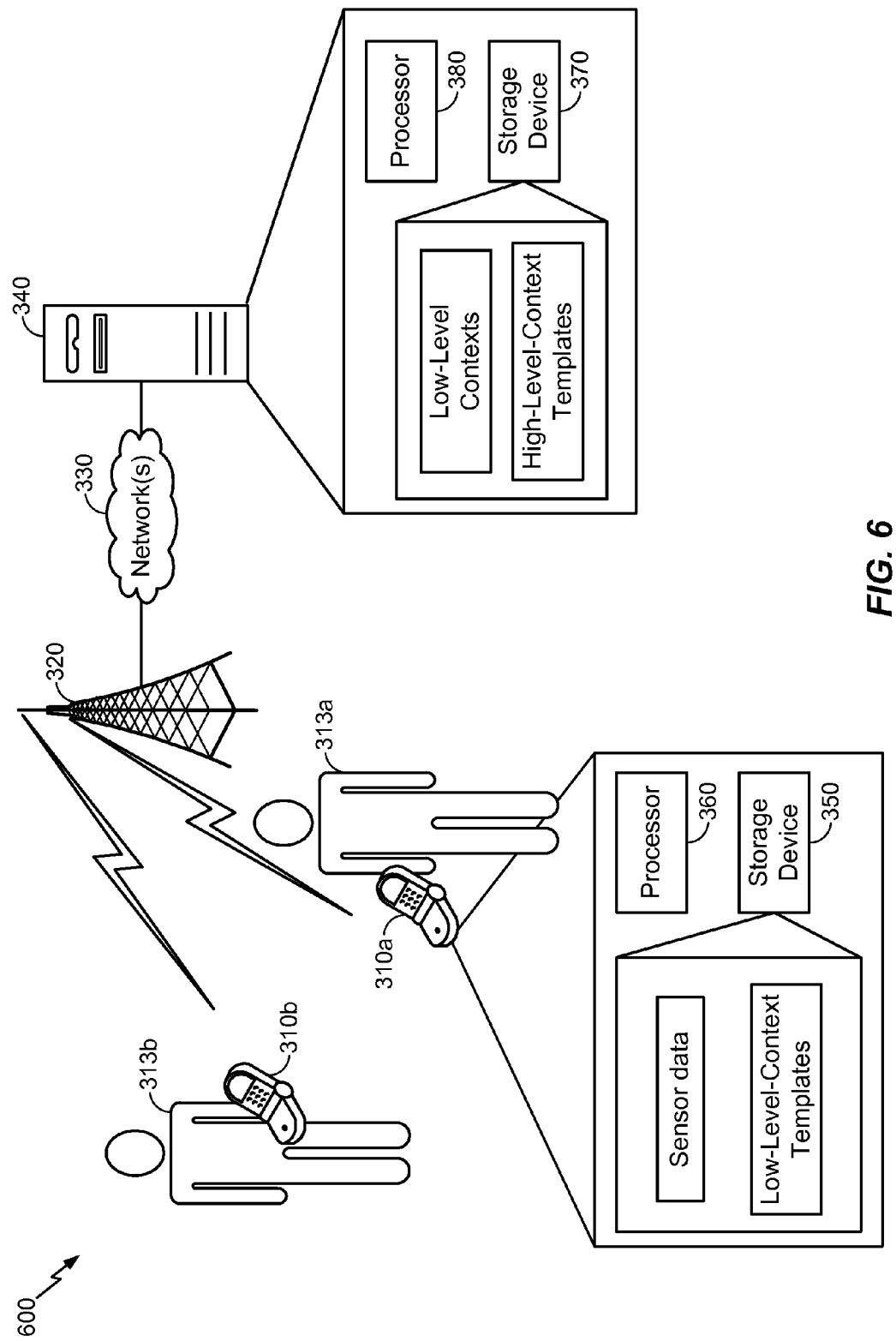
FIG. 6 illustrates an apparatus for inferring a context according to one embodiment of the present invention.

FIG. 6 illustrates another apparatus 600 for inferring a context according to one embodiment of the present invention. In this instance, remote server 340 can infer the final context (e.g., high-level or low-level context). Thus, in this instance, mobile device 310a can collect sensor data and can perform initial low-level context inferences (e.g., motion state, device position or presence of speech) based on the sensor data. The inferred low-level contexts can be transmitted to remote server 340 which can then refine the low-level context and/or infer a high-level context. The refined low-level context and/or high-level context can then be transmitted back to mobile device 310a.

In this embodiment, remote server 340 can include be a part of cloud-computing system and/or can have access to computational resources greater than those available locally at mobile device 310a. Thus, remote server 340 can be able to analyze data from more other mobile devices 310b, analyze more types of data, and/or consider more potential contexts. The accuracy and precision of the inferred contexts can be improved. In some instances, this embodiment can result in an increased context-inference latency, as mobile device 110a may need to continue to communicate with remote server 340 to determine an instantaneous context. In some instances, the increased processing speed results in a decreased context-inference latency.

Figure 7:
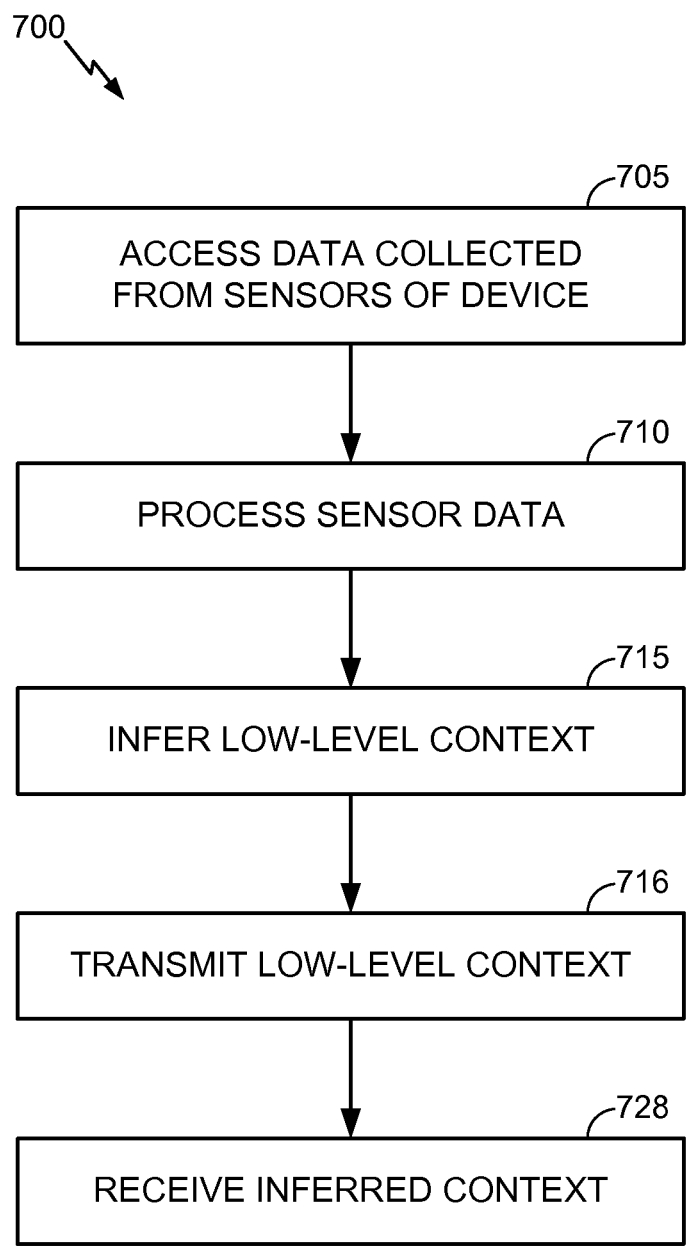
FIG. 7 is a flow diagram of a process for inferring a context according to one embodiment of the present invention.
Figure 8:
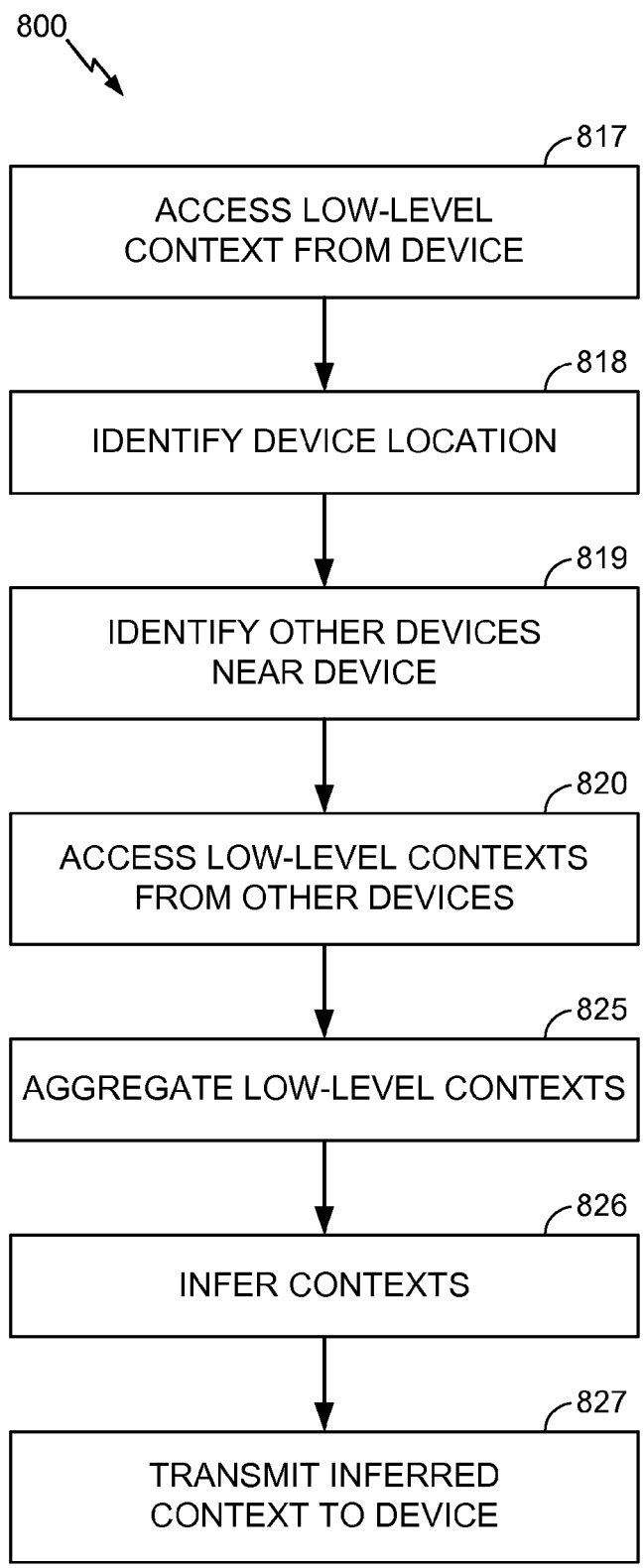
FIG. 8 is a flow diagram of a process for inferring a context according to one embodiment of the present invention.

FIGS. 7 and 8 are flow diagrams of processes 700 and 800 for inferring a context according to one embodiment. Process 700 represents an embodiment of process 400 shown in FIG. 4, and process 800 represents an embodiment of process 500 shown in FIG. 5. In this instance, the multi-statistical summary transmitted to and received by mobile device 310a (e.g., at blocks 527 and 428 in process 500 and process 400, respectively) includes a single inferred context in processes 700 and 800. Thus, mobile device 310a need not separately infer a context but can rather simply rely upon the context inferred by remote server 340.

Figure 9:
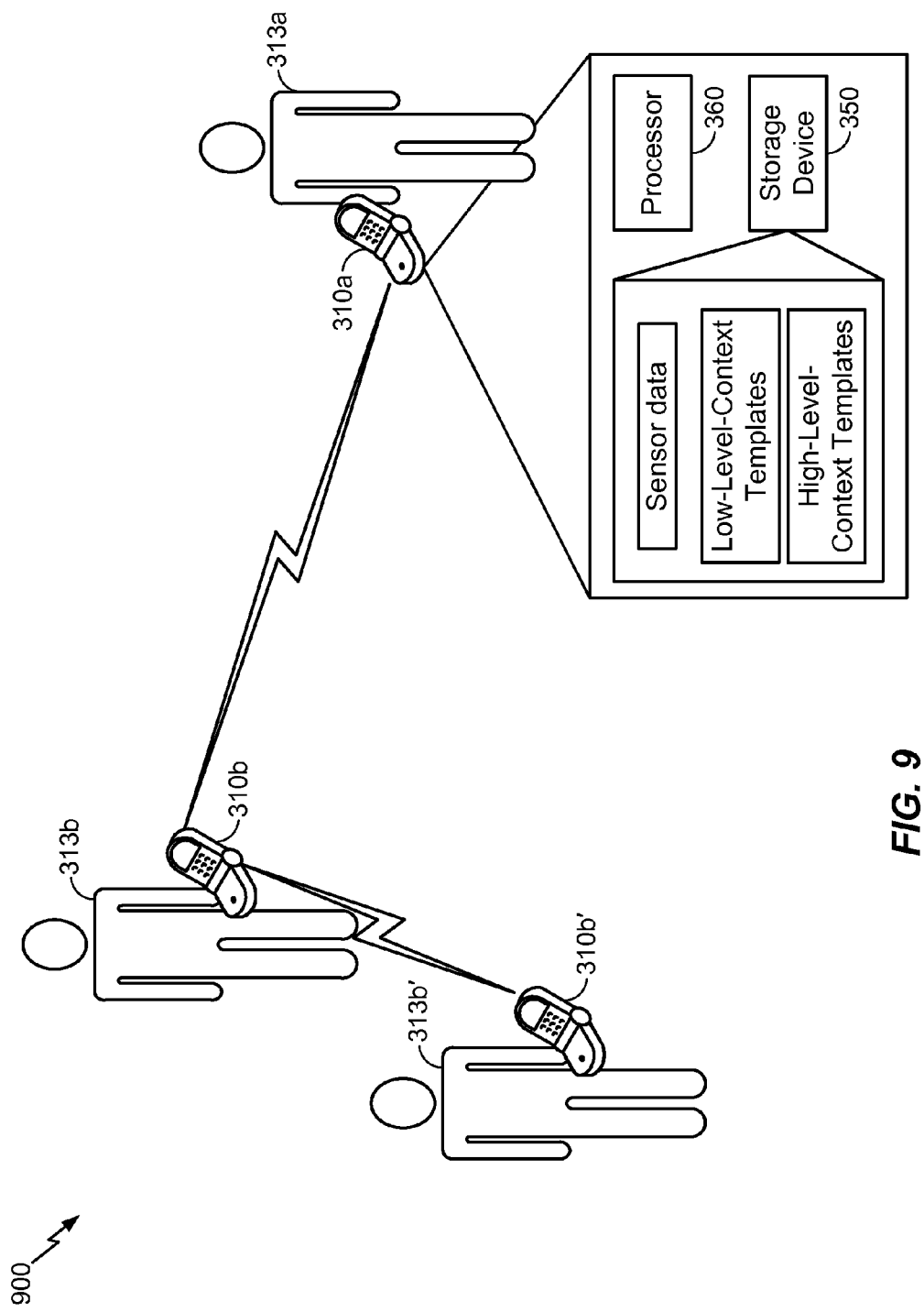
FIG. 9 illustrates an apparatus for inferring a context according to one embodiment of the present invention.

FIG. 9 illustrates yet another apparatus 900 for inferring a context according to one embodiment of the present invention. In this instance, mobile device 310a communicates directly with other mobile devices 310b. For example, mobile device 310a can communicate with other nearby mobile devices 310b using Bluetooth technology or another short-range communication mechanism. Mobile device 310a can identify other nearby mobile devices 310b using, e.g., synchronized Bluetooth discovery or distance measurements using synchronized audio pilot tones.

As illustrated in FIG. 9, it is possible for mobile device 310a to use a first other mobile device 310b to communicate indirectly with a second mobile device 310b'. In this manner, mobile device 310a may be able to communicate with an extended web of mobile devices 310b even if they are outside of a direct-communication range. In some instances, mobile device 310a can systematically increase its discovery search. For example, an initial high- or low-level context can be inferred based on low-level contexts from other mobile devices 310b that can directly communicate with mobile device 310a, and the inference can be refined based on low-level contexts from further other mobile devices 310b' (e.g., at a double-hop radius).

Indirect mobile-device access can further be used to conserve power or speed processing. For example, mobile device 310a can initially communicate with single-hop other mobile devices 310b. If available data is insufficient to meet a criterion (e.g., allow for a reliable context inference, allow for an inference with a specific confidence, or does not reach a data threshold value), then mobile device 310a can communicate with double-hop other mobile devices 310b'. This opportunistic-style communication can avoid indirect communications when unnecessary.

Thus, in some instances, process 200 can be performed in its entirety at mobile device 310a. Mobile device 310a can receive low-level contexts from other nearby devices, can aggregate the contexts, and can infer a (high- or low-level) context based on the aggregated contexts (e.g., by comparing the aggregated contexts to each of a set of templates).

Additional variations are further considered. For example, in addition or instead of gathering data from other mobile devices 310b, an inference of a context of mobile device 310a can be based on data received from non-mobile devices. For example, data (e.g., crowd images, audio signals, activity states of people in view) from nearby cameras, microphones or surveillance systems can be accessed, and context inferences can be based on the data. Using this data, mobile device 310a and/or remote server 340 can be able to estimate how many people are nearby and their motion state.

Figure 10:
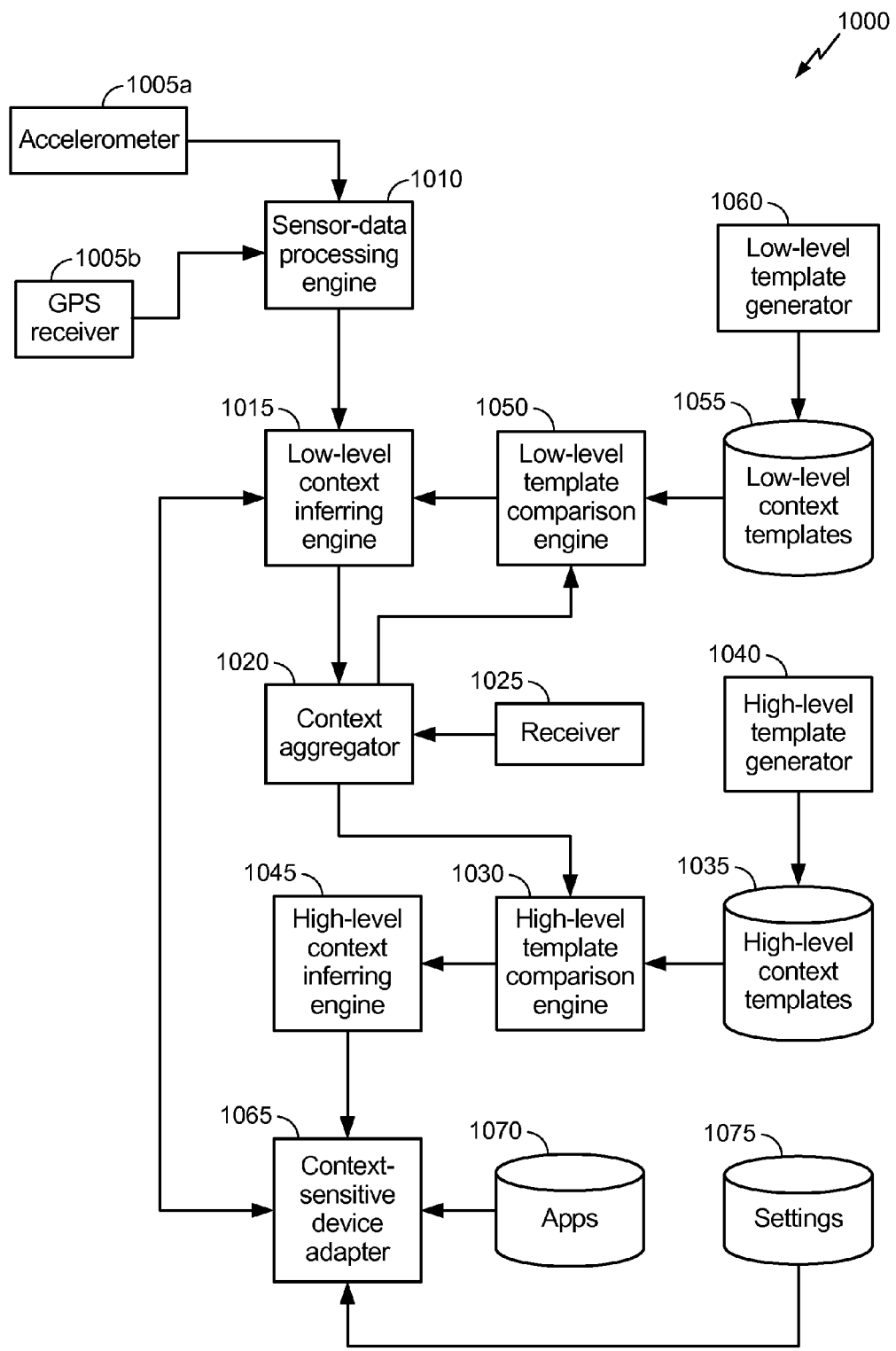
FIG. 10 is a block diagram of a system for inferring a context according to one embodiment of the present invention.

FIG. 10 is a block diagram of a system 1000 for inferring a context according to one embodiment. Mobile device 310a and/or remote server 340 can include components of system 1000. In one instance, mobile device 310a includes some or all components of system 1000, and no components of system 1000 are provided at a remote server 340. In one instance, mobile device 310a includes some components of system 1000, and remote server includes some components of system 1000.

System 1000 can include one or more sensors 1005, such as an accelerometer 1005a and a GPS receiver 1005b. Accelerometer 1005a can collect data indicating an acceleration (along one or more directions) of a mobile device 310a. GPS receiver 1005b can receive signals from GPS satellites. Other types of sensors can further be included in system 1000, such as sensors to receive signals from WiFi access points or cell towers. Sensors 1005 can collect data indicative, e.g., about a position, motion-state and/or location of a device.

Data collected by sensors 1005 can be processed by a sensor-data processing engine 1010. Sensor-data processing engine 1010 can, e.g., smooth acceleration data, estimate a location of mobile device 310a (e.g., based on signals received by GPS receiver 1005b), estimate a speed of mobile device 310a (e.g., based on time-lapsed signals received by GPS receiver 1005b), and/or estimate an acceleration of mobile device 310a (e.g., based on data collected by accelerometer 1005a).

The processed data can be fed to a low-level context inferring engine 1015, which can infer a low-level context for mobile device 310a. The low-level context can include, e.g., a motion state, device position and/or device location. In some instances, the low-level context is inferred using one or more fixed, dynamic and/or learned rules. The rules can include comparing processed data (e.g., an average absolute acceleration along one or more directions or a variability of acceleration magnitudes) to one or more thresholds.

A context aggregator 1020 can receive the inferred low-level context for mobile device 310a. Context aggregator 1020 can also be coupled to a receiver 1025 that receives inferred low-level contexts for other mobile devices 310b. In some instances, receiver 1025 receives raw or processed sensor data, e.g., in addition to or instead of the inferred low-level contexts. In instances in which receiver 1025 receives raw or processed sensor data instead of the inferred low-level context, receiver 1025 can be coupled to low-level context inferring engine 1015 such that low-level contexts can be inferred.

Context aggregator 1020 can determine a set of devices for which the low-level contexts can be aggregated. The set can be determined by assessing one or more criteria (e.g., location-based criterion, temporal criterion or confidence-metric criterion). For example, context aggregator 1020 can identify a set of other mobile devices 310b currently near mobile device 310a. In some instances, context aggregator 1020 aggregates low-level contexts across all devices for which low-level contexts have been recently received. This can be particularly advantageous, e.g., if mobile device 310a includes receiver 1025, as low-level contexts can be selectively received from only nearby devices.

Context aggregator 1020 can aggregate the received data (e.g., the received low-level contexts) to produce, e.g., a distribution or count. For example, context aggregator 1020 can determine how many (e.g., an absolute number or percentage) nearby devices are associated with each of the following motion-states: stationary, walking, running and driving.

The aggregated data can be compared to templates in order to infer a high-level context of mobile device 310a. Thus, in one embodiment, the aggregated data can be transmitted to a high-level template comparison engine 1030, which compares the aggregated data to each of a set of high-level context templates 1035. Each high-level context template 1035 can be associated with a high-level context. High-level template comparison engine 1030 can, e.g., determine a match score between the aggregated data and each template 1035. In some instances, the high-level template comparison estimates the probability of observing the aggregated data based on each template 1035.

High-level context templates 1035 can be generated by a high-level template generator 1040. High-level template generator 1040 can determine accurate high-level contexts, via explicit user data (e.g., confirming an inferred context, selecting between possible contexts or entering a context), via non-explicit user data (e.g., whether context-associated apps were used or whether context-associated settings were changed) or via non-user data (e.g., using clustering techniques to post-hoc estimate contexts based on later-received data). Each low-level context template 1055 can therefore characterize aggregated data associated with a single context (e.g., indicating a mean distribution, a median distribution, a range of distributions, a mean count, a median count, a range of counts). High-level context templates 1035 can be dynamic in some instances. In some instances, high-level context templates 1035 are fixed (e.g., based on definitions by a developer).

High-level template comparison engine 1030 can send the results of the template comparisons to a high-level context inferring engine 1045. High-level context inferring engine 1045 can infer one or more high-level contexts based on the comparison. For example, high-level context inferring engine 1045 can infer that mobile device 310a is in each high-level context for which an associated template comparison (e.g., a match score) exceeds a threshold. As another example, high-level context inferring engine 1045 can select one or more high-level contexts based on which high-level context templates 1035 best matched the aggregated data.

The aggregated data can be compared to templates in order to improve or refine an inferred low-level context of mobile device 310a (e.g., in addition to or instead of inferring a high-level context). Thus, the aggregated data can, in some instances be analyzed by a low-level template comparison engine 1050, which compares the aggregated data to each of a set of low-level context templates 1055. Each low-level context template 1055 can be associated with a low-level context. Low-level template comparison engine 1050 can, e.g., determine a match score between the aggregated data and each template 1055. In some instances, the low-level template comparison estimates the probability of observing the aggregated data based on each template 1055.

Low-level context templates 1050 can be generated by a low-level template generator 1060. Low-level template generator 1060 can determine accurate low-level contexts, via explicit user data (e.g., confirming an inferred context, selecting between possible contexts or entering a context), via non-explicit user data (e.g., whether context-associated apps were used or whether context-associated settings were changed) or via non-user data (e.g., using clustering techniques to post-hoc estimate contexts based on later-received data). Each low-level context template 1055 can therefore characterize aggregated data associated with a single context (e.g., indicating a mean distribution, a median distribution, a range of distributions, a mean count, a median count, a range of counts). Low-level context templates 1055 can be dynamic in some instances. In some instances, low-level context templates 1055 are fixed (e.g., based on definitions by a developer).

Low-level template comparison engine 1050 can send the results of the template comparisons to low-level context inferring engine 1015. Low-level context inferring engine 1015 can infer one or more low-level contexts based on the comparison. In some instances, inferring the one or more low-level contexts includes revising a previously inferred low-level context. Low-level context inferring engine 1015 can infer that mobile device 310a is in each low-level context for which an associated template comparison (e.g., a match score) exceeds a threshold, or low-level context inferring engine 1015 can select one or more low-level contexts based on which low-level context templates 1055 best matched the aggregated data.

The inferred high- and/or low-level context can be used by context-sensitive device adapter 1065 to adapt a property of mobile device 310a. For example, context-sensitive device adapter 1065 can select a subset of available apps 1070 to present to a user (e.g., on a desktop or menu screen). As another example, context-sensitive device adapter 1065 can identify device settings 1075 to implement. Settings 1075 can include, e.g., a ring volume, icon sizes, font styles or sizes, and/or device-connection settings (e.g., auto-connect, require permission or no connection).

It will be appreciated that one or more components depicted in FIG. 10 can be implemented using hardware and/or software. For example, one or more of sensor-data processing engine 1010, low-level context inferring engine 1015, context aggregator 1020, high-level template comparison engine 1030, high-level template generator 1040, high-level context inferring engine 1045, low-level template comparison engine 1050, low-level template generator 1060 and contest-sensitive device adapter 1065 can include one or more processors, memory, communication interface(s), and/or processors communicatively linked therewith, and/or any of the structure discussed generally in reference to system 1000. As a further example, one or more components may be implemented by memory storing instructions, which may be executed by one or more processors.

Thus, a context can be inferred for mobile device 310a by collecting data from a set of mobile devices 310b, and functionalities of mobile device 310a can be dynamically adjusted in an attempt to maximize a net utility of mobile device 310a given the context. A more detailed, more accurate and more useful inference can be made based on the aggregated data, as compared to an inference based only on data collected from a single device. Inferences based only on single-device data can be unreliable due to unreliable or biased sensor data or unavailable sensor data (e.g., due to microphone logging being turned off or a broken sensor). Further, single-device sensor data associated with multiple low-level contexts or associated with multiple high-level contexts can be practically indistinguishable. For example, sensor-data distinctions between "sit" and "stand" can be very nuanced. As another example, sensor MSDP data associated with high-level contexts of "party" and "watching television" can also be very similar. Additionally, attempting to maximize data collected from sensors can drain a mobile device's battery (e.g., by repeatedly collecting and processing microphone data).

Figure 11:
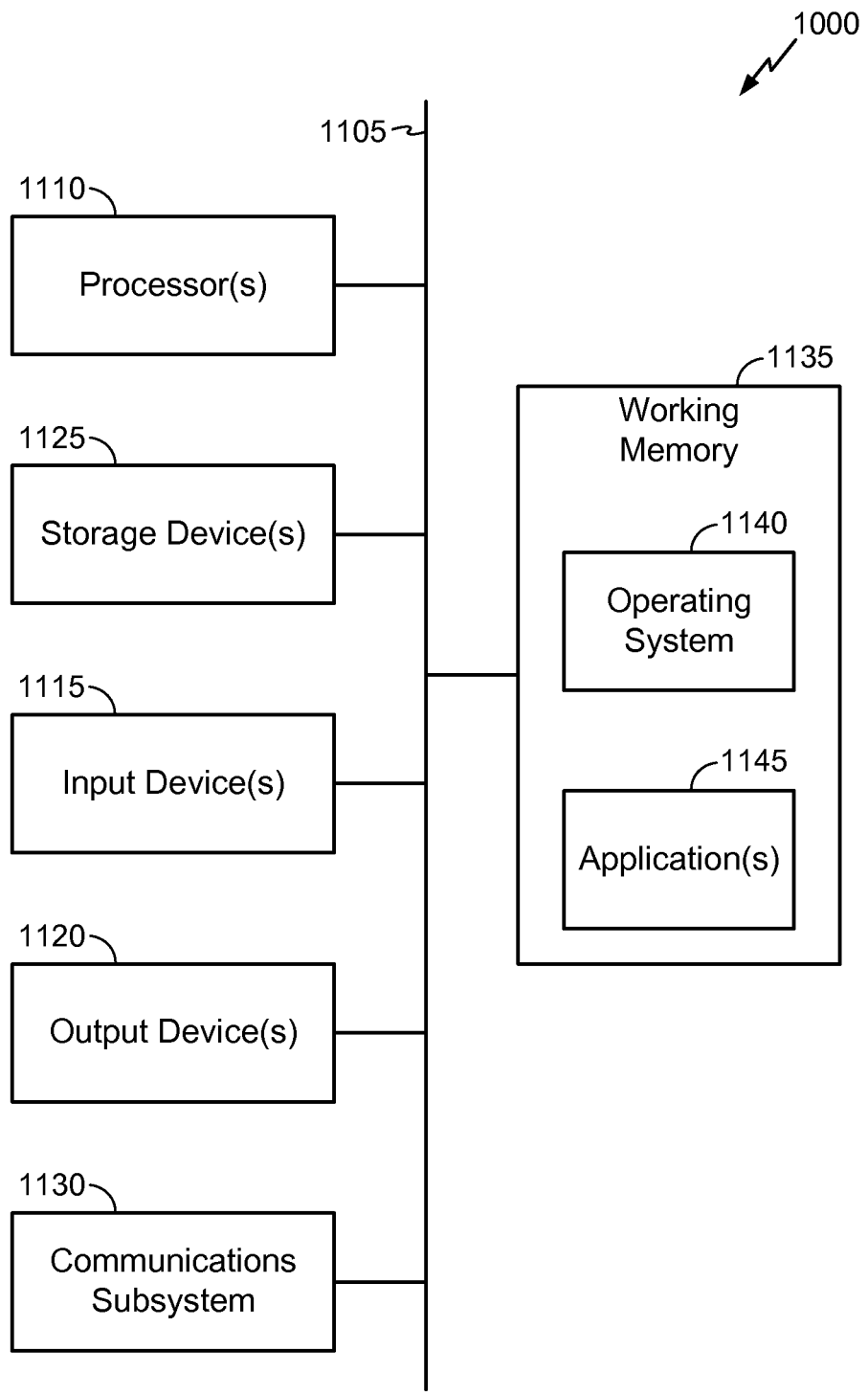
FIG. 11 illustrates an embodiment of a computer system.

A computer system as illustrated in FIG. 11 can incorporate as part of the previously described computerized devices. For example, computer system 1100 can represent some of the components of the mobile devices and/or the remote computer systems discussed in this application. FIG. 11 provides a schematic illustration of one embodiment of a computer system 1100 that can perform all or part of methods described herein the methods described herein. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a mouse, a keyboard and/or the like; and one or more output devices 1120, which can include without limitation a display device, a printer and/or the like.

The computer system 1100 may further include (and/or be in communication with) one or more storage devices 1125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computer system, such as the system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1100) to perform methods in accordance with various embodiments of the invention. According to a set of embodiments, some or all of the procedures of such methods are performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 1100, various computer-readable media might be involved in providing instructions/code to processor(s) 1110 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

It will be further appreciated that structure can perform one or more blocks or elements of described or depicted processes (e.g., process 200, 400, 500, 700 and/or 800). For example, such structure can include one or more processors, memory, communication interface(s), sensors (e.g., a camera, microphone, and/or other sensors) and/or processors communicatively linked therewith, and/or any of the structure discussed generally in reference to processes described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The following examples are provided to further illustrate embodiments of the invention:

Example 1

A user of a mobile device is driving on an interstate. Using only single-device information, the mobile device erroneously infers a "sit" low-level context as opposed to "driving" due to algorithm limitation. The mobile device determines its location and transmits it to a remote server. Histograms of motion states from nearby mobile devices (e.g., currently nearby or near a same location in a time past) are determined by the remote server and transmitted to the mobile device. The initial "sit" low-level context is revised in view of the inconsistency with these other contexts.

Example 2

A user of a mobile device is sitting at home and hosting a party. Using only single-device information, the mobile device infers that the user is "sitting" but cannot infer a high-level context based on the available sensor data. The mobile device determines its location and transmits it to a server in a cloud-computing system. A server detects that 30 people are within 50 feet from a location and transmits this information to the mobile device. Based on this information, the server infers a high-level "party" context and transmits the inferred context to the mobile device.

Example 3

A user of a mobile device is standing, walking and sitting at work. Using only single-device information, the mobile device infers MSDP contexts but repeatedly switches between high-level inferences of "at home" and "at work" due to similar underlying low-level context profiles. The mobile device then discovers nearby devices through Bluetooth technology. The mobile device is able to connect to 10 devices in a single hop and 50 devices in a double hop. Based on this information, the mobile device correctly identifies "work" as the high-level context.

Having described several example configurations, various modifications, alternative constructions, and equivalents can be used without departing from the spirit of the disclosure. For example, the above elements can be components of a larger system, wherein other rules can take precedence over or otherwise modify the application of the invention. Also, a number of steps can be undertaken before, during, or after the above elements are considered. Accordingly, the above description does not bound the scope of the claims.

What is claimed is:

1. A method for inferring a high-level context associated with a mobile device, the method comprising: accessing low-level context information for each of a plurality of other devices, wherein location information associated with each of the other devices indicates a proximity to a location of the mobile device, and wherein the low-level context information for each of the other devices is based on data collected by a sensor of the respective other device; aggregating the low-level context information across the plurality of other devices; comparing the aggregated low-level context information to a plurality of templates, each template being associated with a high-level context and including one or more histograms of context data; determining match scores between the aggregated low-level context information and each of the one or more histograms of context data; and transmitting, to the mobile device, a multi-device statistical summary comprising the aggregated low-level context information and the match scores; and the mobile device inferring a context based on the multi-device statistical summary and additional data not included in the multi-device statistical summary.

2. The method of claim 1, wherein the plurality of other devices comprise at least one non-mobile device in a security system.

3. The method of claim 1, wherein the location information associated with each of the other devices indicates a current proximity to the location of the mobile device, the location of the mobile device being a current location.

4. The method of claim 1, wherein each of the other devices and the mobile device are estimated to be at a same type of location.

5. The method of claim 1, further comprising:
estimating a time context of the mobile device, wherein the mobile device is estimated to be in the time context and at the location simultaneously, and wherein each of the plurality of other devices is estimated to be at the respective proximity during another time context, the time context and the another time context being the same.

6. The method of claim 1, wherein the low-level context information comprises information indicative of a motion state, a device position or both.

7. The method of claim 1, wherein the high-level context comprises a situation.

8. The method of claim 1, wherein the low-level context information comprises motion sensor information from which a low-level context can be inferred.

9. The method of claim 1, wherein at least one of the other devices comprises another mobile device.

10. The method of claim 1, wherein each high-level context of a plurality of high-level contexts is associated with a set of templates, each template in the set of templates being associated with a different type of low-level context.

11. A system for inferring a high-level context associated with a mobile device, the system comprising: memory; a processor coupled to the memory; a context aggregator configured to: access, via the processor, low-level context information for each of a plurality of other devices, wherein location information associated with each of the other devices indicates a proximity to a location of the mobile device, and wherein the low-level context information for each of the other devices is based on data collected by a sensor of the respective other device; aggregate the low-level context information across the plurality of other devices; a high-level template comparison engine configured to: compare, via the processor, the aggregated low-level context information to a plurality of templates, each template being associated with a high-level context and including one or more histograms of context data; determine match scores between the aggregated low-level context information and each of the one or more histograms of context data; and a transceiver configured to transmit, to the mobile device, a multi-device statistical summary comprising the aggregated low-level context information and the match scores; and the mobile device inferring a context based on the multi-device statistical summary and additional data not included in the multi-device statistical summary.

12. The system of claim 11, further comprising a low-level context inferring engine configured to infer a low-level context for the mobile device based on data collected by a sensor of the mobile device.

13. The system of claim 11, wherein the context aggregator is configured to aggregate the low-level context information for each of the plurality of other devices and low-level context information for the mobile device.

14. The system of claim 11, wherein the aggregated low-level context information comprises a distribution.

15. The system of claim 11, wherein comparing the aggregated low-level context information to a plurality of templates comprises generating a score associated with each template of the plurality of templates.

16. A system for inferring a high-level context associated with a mobile device, the system comprising: means for accessing low-level context information for each of a plurality of other devices, wherein location information associated with each of the other devices indicates a proximity to a location of the mobile device, and wherein the low-level context information for each of the other devices is based on data collected by a sensor of the respective other device; means for aggregating the low-level context information across the plurality of other devices; means for comparing the aggregated low-level context information to a plurality of templates, each template being associated with a high-level context and including one or more histograms of context data; means for determining match scores between the aggregated low-level context information and each of the one or more histograms of context data; and means for transmitting, to the mobile device, a multi-device statistical summary comprising the aggregated low-level context information and the match scores; scores and the mobile device comprising means for inferring a context based on the multi-device statistical summary and additional data not included in the multi-device statistical summary.

17. The system of claim 16, wherein the location information associated with each of the other devices indicates a current proximity to the current location of the mobile device.

18. The system of claim 16, further comprising:
means for estimating a time context of the mobile device, wherein the mobile device is estimated to be in the time context and at the location simultaneously, and wherein each of the plurality of other devices is estimated to be at the respective proximity during another time context, the time context and the another time context being the same.

19. The system of claim 16, wherein the low-level context information comprises information indicative of a motion state, a device position or both.

20. A computer-readable storage medium containing program instructions, that, when executed by a processor, cause the processor to execute a method comprising: accessing low-level context information for each of a plurality of other devices, wherein location information associated with each of the other devices indicates a proximity to a location of a mobile device, and wherein the low-level context information for each of the other devices is based on data collected by a sensor of the respective other device; aggregating the low-level context information across the plurality of other devices; comparing the aggregated low-level context information to a plurality of templates, each template being associated with a high-level context and including one or more histograms of context data; determining match scores between the aggregated low-level context information and each of the one or more histograms of context data; and transmitting, to the mobile device, a multi-device statistical summary comprising the aggregated low-level context information and the match scores; and the mobile device inferring a context based on the multi-device statistical summary and additional data not included in the multi-device statistical summary.

21. The computer-readable storage medium of claim 20, wherein the method further comprises estimating the location of the mobile device based on data collected by the sensor of the mobile device.

22. The computer-readable storage medium of claim 20, wherein the method further comprises identifying an application from a set of available software applications based on the high-level context.

23. The computer-readable storage medium of claim 20, wherein the sensor of the mobile device and the sensor of at least one of the other devices include different types of sensors.

24. A method for inferring a context associated with a mobile device, the method comprising: accessing low-level context information for each of a plurality of other devices, wherein location information associated with each of the other devices indicates a proximity between a location of the other device at a first time and a location of the mobile device at a second time, the first time and the second time being different, and wherein the low-level context information for each of the other devices is based on data collected by a sensor of the respective other device; aggregating the low-level context information across the plurality of other devices; comparing the aggregated low-level context information to a plurality of templates, each template being associated with a high-level context and including one or more histograms of context data; determining match scores between the aggregated low-level context information and each of the one or more histograms of context data; and transmitting, to the mobile device, a multi-device statistical summary comprising the aggregated low-level context information and the match scores; and the mobile device inferring a context based on the multi-device statistical summary and additional data not included in the multi-device statistical summary.

25. The method of claim 24, wherein the plurality of other devices comprise at least one non-mobile device in a security system.

26. The method of claim 24, wherein the inferred context includes a high-level context.

27. The method of claim 24, wherein inferring the context includes refining a previously inferred a low-level context.

28. A system for inferring a context associated with a mobile device, the system comprising: memory; a processor coupled to the memory; a context aggregator configured to: access, via the processor, low-level context information for each of a plurality of other devices, wherein location information associated with each of the other devices indicates a proximity between a location of the other device at a first time and a location of the mobile device at a second time, the first time and the second time being different, and—wherein the low-level context information for each of the other devices is based on data collected by a sensor of the respective other device; and aggregate the low-level context information across the plurality of other devices; and a context inferring engine configured to: compare the aggregated low-level context information to a plurality of templates, each template being associated with a high-level context and including one or more histograms of context data; determine, via the processor, a match score between the aggregated low-level context information and one or more histograms of context data; and a transceiver configured to transmit, to the mobile device, a multi-device statistical summary comprising the aggregated low-level context information and the match scores; and the mobile device inferring a context based on the multi-device statistical summary and additional data not included in the multi-device statistical summary.

29. The system of claim 28, wherein aggregating the low-level context information comprises generating one or more histograms with respect to a low-level context inference associated with each device of the plurality of other devices.

30. The system of claim 28, wherein aggregating the low-level context information comprises assessing a location-based criterion or a temporal-based criterion with respect to a preliminary set of devices to identify the other devices.

31. The system of claim 28, further comprising a template comparison engine configured to compare the aggregated low-level context information to a plurality of templates, each template being associated with a context.

32. A system for inferring a context associated with a mobile device, the system comprising: means for accessing low-level context information for each of a plurality of other devices, wherein location information associated with each of the other devices indicates a proximity between a location of the other device at a first time and a location of the mobile device at a second time, the first time and the second time being different, and wherein the low-level context information for each of the other devices is based on data collected by a sensor of the respective other device; means for aggregating the low-level context information across the plurality of other devices; means for comparing the aggregated low-level context information to a plurality of templates, each template being associated with a high-level context and including one or more histograms of context data; means for determining match scores between the aggregated low-level context information and the one or more histograms of context data; and means for transmitting, to the mobile device, a multi-device statistical summary comprising the aggregated low-level context information and the match scores; and the mobile device comprising means for inferring a context based on the multi-device statistical summary and additional data not included in the multi-device statistical summary.

33. The system of claim 32, wherein the means for accessing low-level context information for each of the plurality of other devices comprises a Bluetooth receiver.

34. The system of claim 32, further comprising means for identifying the plurality of other devices by detecting all devices at a location less than a threshold distance away from the location of the mobile device.

35. The system of claim 32, wherein the low-level context information characterizes a motion state, a device position or both.

36. The system of claim 32, wherein the inferred context characterizes a situation.

37. A computer-readable storage medium containing program instructions, that, when executed by a processor, cause the processor to execute a method comprising: accessing low-level context information for each of a plurality of other devices, wherein location information associated with each of the other devices indicates a proximity between a location of the other device at a first time and a location of a mobile device at a second time, the first time and the second time being different, and wherein the low-level context information for each of the other devices is based on data collected by a sensor of the respective other device; aggregating the low-level context information across the plurality of other devices; determining match scores between the aggregated low-level context information and each of the one or more histograms of context data; and transmitting, to the mobile device, a multi-device statistical summary comprising the aggregated low-level context information and the match scores; and the mobile device inferring a context based on the multi-device statistical summary and additional data not included in the multi-device statistical summary.

38. The computer-readable storage medium of claim 37, wherein the method further comprises estimating the location of the mobile device based on data collected by the sensor of the mobile device.

39. The computer-readable storage medium of claim 37, wherein the method further comprises identifying a software application from a set of available software applications based on the inferred context.

40. The computer-readable storage medium of claim 37, wherein the sensor of the mobile device and the sensor of at least one of the other devices include different types of sensors.

* * * * *